(12) United States Patent
Breslin et al.

(10) Patent No.: US 8,971,948 B1
(45) Date of Patent: Mar. 3, 2015

(54) SYSTEMS AND METHODS FOR COMPENSATING ANTENNA GAIN IMBALANCE

(75) Inventors: Donald Breslin, Sunnyvale, CA (US); Enis Akay, Hong Kong Island (HK)

(73) Assignee: Qualcomm Incorporated, San Diego, CA (US)

( * ) Notice: Subject to any disclaimer, the term of this patent is extended or adjusted under 35 U.S.C. 154(b) by 501 days.

(21) Appl. No.: 12/950,092

(22) Filed: Nov. 19, 2010

(51) Int. Cl.
*H04B 7/00* (2006.01)
*H04W 52/24* (2009.01)

(52) U.S. Cl.
CPC ............................. *H04W 52/241* (2013.01)
USPC ........... 455/522; 455/69; 455/70; 455/13.3; 455/19; 455/25

(58) Field of Classification Search
USPC ......... 455/550.1, 522, 69–70, 13.3, 19, 25, 455/82, 83, 107, 121, 193.1
See application file for complete search history.

(56) References Cited

U.S. PATENT DOCUMENTS

| | | | | |
|---|---|---|---|---|
| 6,226,507 | B1 * | 5/2001 | Ramesh et al. | 455/277.1 |
| 2007/0099670 | A1 * | 5/2007 | Naguib et al. | 455/562.1 |
| 2010/0026561 | A1 | 2/2010 | Takano et al. | |
| 2010/0081402 | A1 * | 4/2010 | Itkin et al. | 455/127.2 |
| 2011/0096815 | A1 * | 4/2011 | Shin et al. | 375/219 |
| 2011/0207415 | A1 * | 8/2011 | Luo et al. | 455/68 |
| 2011/0243007 | A1 * | 10/2011 | Xiao | 370/252 |
| 2012/0082192 | A1 * | 4/2012 | Pelletier et al. | 375/219 |
| 2012/0115531 | A1 * | 5/2012 | Gaal et al. | 455/522 |

FOREIGN PATENT DOCUMENTS

| | | |
|---|---|---|
| CN | 1241887 A | 1/2000 |
| CN | 1275274 A | 11/2000 |
| CN | 101689711 A | 3/2010 |
| JP | H10503892 A | 4/1998 |
| JP | H11239075 A | 8/1999 |
| JP | 2003124731 A | 4/2003 |
| JP | 2010034937 A | 2/2010 |
| WO | WO-9534103 A1 | 12/1995 |

OTHER PUBLICATIONS

International Search Report and Written Opinion—PCT/US2011/053610—ISA/EPO—Jan. 17, 2012.

* cited by examiner

*Primary Examiner* — Fayyaz Alam
(74) *Attorney, Agent, or Firm* — Bay Area Technology Law Group PC

(57) ABSTRACT

This disclosure involves methods and systems for compensating for imbalanced transmit antenna gains. A transmit controller independently samples the received signal in each chain of a transceiver selectively adjusts the transmit power at each antenna to minimize any indicated imbalance to improve performance at the node receiving the transmission.

18 Claims, 2 Drawing Sheets

SYSTEMS AND METHODS FOR COMPENSATING ANTENNA GAIN IMBALANCE

FIELD OF THE PRESENT INVENTION

The present disclosure generally relates to multiple-input-multiple-output (MIMO) wireless communication systems and more particularly to systems and methods for improving transmit performance

BACKGROUND OF THE INVENTION

Wireless communication stations employing multiple antennas for transmitting and receiving data are known as multiple-input-multiple-output (MIMO) systems The use of multiple antennas offers significant improvement in data throughput and link range without requiting additional bandwidth or increased transmission power MIMO systems exhibit better spectral efficiency than conventional single antenna systems, while having more reliable links and reduced fading. As implied by the name, typical MIMO communication stations employ a plurality of antennas at the transmitter and receiver. One basis for the improvements offered by MIMO systems is the leveraging of the multi-path environment in which such systems are often used. Accordingly, each signal experiences multipath propagation allowing multiple orthogonal channels to be generated between the transmitter and receiver. In turn, data is transmitted simultaneously in parallel over those channels, without requiring more bandwidth.

Despite the advantages represented by MIMO communication systems, there are areas where performance could be improved. As discussed above, multiple independent propagation paths between stations are necessary to create the multiple orthogonal channels that enable the multistream improvements in data throughput. However, an imbalance in the relative path loss between the multiple propagation paths can lead to conditions where the spread in power of the multiple signals arriving at the receiver exceeds the receiver's dynamic range Since the receiver typically employs an automatic gain function to adjust the total in-band power to a desired level, a signal experiencing relatively minimal path loss will be correspondingly stronger and leveled appropriately. On the other hand, a signal experiencing relatively greater path loss will be weaker and may be closer to the receiver's noise floor, causing it to have a poor signal-to-noise ratio Indeed, when the path loss imbalance between signals is large enough, the dynamic range of the receiver is overcome and it will be unable to simultaneously recover both the strong and weak signal properly. As a result, the transmitter is forced to use a lower modulation rate or lower number of independent streams of simultaneous data, thus reducing the PHY data throughput.

As will be appreciated, the transmit antenna gains themselves may also be subject to an imbalance that can lead to this condition. Short range, line-of-sight (LOS) channel conditions typically have relatively equal losses for the direct and cross paths of the transmit and receive antennas. However, physical orientation and location of the independent antennas are major factors impacting antenna gain in a MIMO system. As a result, the antennas can exhibit significant imbalances in gain with resulting impaired performance in LOS conditions. Thus, even though there is a relatively balanced channel with respect to path loss, the power into the channel is already imbalanced due to the mismatch in transmit antenna gain and the signals arrive at the receiver with a large spread in power This causes the same type of stress to the receiver's dynamic range as the imbalanced path loss condition described above.

An example of this condition is shown in FIG. 1, which schematically represents the effects of imbalanced transmission antenna gain over a balanced channel from Node A to Node B in a 3×3 MIMO system. The baseband delivers representative pulse waveform signals 100, 102 and 104 indicated by power versus frequency plots having substantially equivalent power levels into three transmit chains 106, 108 and 110. Due to imbalanced antenna gain, indicated by transmit antenna gain block 112, signals 116 and 118 are attenuated relative to signal 114. Each chain is transmitted over a balanced channel in block 120. Correspondingly, the signal sent by each transmit chain arrives at receive antenna gain block 122, shown with balanced antenna gain. Thus, each receive chain 124, 126 and 128 receives a composite of the signals from each transmit chain, indicated with respect to receive chain 124 by signal 130. As can be seen, the components of signal 130 do not have equivalent power levels and the spread potentially exceeds the dynamic range of the receiver or otherwise degrades its performance. Although not shown, the same conditions exist in the received composite signal at the other two chains.

Through testing, it has been determined that the imbalanced antenna gain transmission impacts the far side receiver but imbalanced antenna gain at receive is compensated for by automatic gain control typically present in a receiver as shown in FIG. 2 Signals 200, 202 and 204, having substantially equivalent power levels are fed into three transmit chains 206, 208 and 210 for transmission from Node B to Node A. The signals have a balanced antenna gain during transmission, as indicated by transmit antenna gain block 212. The signals are transmitted over a balanced channel in block 214. As such, the components of composite signals 216, 218 and 220 arriving at Node A also have substantially equivalent power levels. The signals at Node A experience an imbalanced antenna gain, as indicated by receive antenna gain block 222 and are fed into receive chains 224, 226 and 228. Due to the imbalanced gain, composite signals 232 and 234 are attenuated relative to composite signal 230. However, the receiver's independent automatic gain control (AGC) for each chain compensates for this attenuation in AGC block 236, delivering equalized composite signals 238, 240 and 242 to the baseband One conventional strategy for compensating for imbalances in transmit channels for MIMO communications systems relies on beamforming techniques which seek to adjust characteristics of the signal broadcast from each antenna to focus the transmitted energy at the receiver However, beamforming techniques necessarily require knowledge about the characteristics of the communication channels to allow the appropriate adjustments to be made to the transmission signals and correspondingly require relatively complicated channel estimation strategies, such as determination of an appropriate steering matrix.

Accordingly, it would be desirable to provide systems and methods for wireless communication that minimize the dynamic range experienced by the receiver to avoid reductions in data throughput. Similarly, it would be desirable to provide systems and methods that are able to compensate for imbalanced antenna gains without incurring the complexity associated with beamforming. This invention satisfies these and other needs.

SUMMARY OF THE INVENTION

In accordance with the above objects and those that will be mentioned and will become apparent below, this disclosure is directed to a method for compensating imbalanced transmit antenna gain in a wireless communication system having a transmission node with at least first and second antennas, first and second transmit chains associated with the first and second antennas and first and second receive chains associated with the first and second antennas, comprising the steps of sampling signal strength in the first and second receive chains, determining an imbalance in antenna gain on the basis of the sampled signal strength, and adjusting the transmit power of the first antenna to offset the imbalance. Preferably, the step of sampling signal strength in the first and second receive chains comprises measuring a received signal strength indicator. Also preferably, the step of adjusting the transmit power of the first antenna occurs only when a signal strength of greater than approximately 40 dB is measured in a receive chain. It is also preferable to adjust the transmit power of the first antenna occurs only when a difference between the signal strength of the first receive chain and the signal strength of the second receive chain exceeds a threshold value In one embodiment, the step of adjusting the transmit power comprises adjusting the transmit power of the first antenna by an amount approximately one half the difference between the signal strength of the first receive chain and the signal strength of the second receive chain. Alternatively, the transmit power of the first antenna is adjusted by an amount approximately equal to the difference between the signal strength of the first receive chain and the signal strength of the second receive chain.

Another aspect of the disclosure involves the step of adjusting the transmit power by adjusting a power amplifier of the first transmit chain Preferably, the step of adjusting the transmit power also includes adjusting analog and digital gains of the first transmit chain.

Yet another aspect of the disclosure is directed to the step of adjusting the transmit power by adjusting the transmit power of the first antenna by a fixed amount. In the noted embodiment, it is preferable to readjust the transmit power of the first antenna by the fixed amount if the step of adjusting the transmit power of the first antenna by a fixed amount resulted in an improvement in data throughput.

The disclosure is also directed to a system with a transmission node having at least first and second antennas, first and second transmit chains associated with the first and second antennas, first and second receive chains associated with the first and second antennas, and a transmission power controller configured to adjust transmit power at the first and second antennas, wherein the transmission power controller adjusts the transmit power of the first antenna when signal strength in the first receive chain differs from signal strength in the second receive chain. Preferably, the first and second receive chains have a signal power sensor functionally connected to the transmission power controller. Also preferably, the first and second receive chains have a low noise amplifier and the signal power sensor is positioned downstream from the low noise amplifier.

In one embodiment, the signal power sensor is configured to measure a received signal strength indicator. The transmit power controller can be configured to adjust the transmit power of the first antenna when the signal power sensor measures a signal strength in a receive chain greater than approximately 40 dB. Further, the transmit power controller can be configured to adjust the transmit power of the first antenna when the signal strength in the first receive chain differs from the signal strength in the second receive chain by a threshold value.

In one aspect, the transmit power controller adjusts the transmit power of the first antenna by an amount approximately one half the difference between the signal strength of the first receive chain and the signal strength of the second receive chain. Alternatively, the transmit power controller adjusts the transmit power of the first antenna by an amount approximately equal to the difference between the signal strength of the first receive chain and the signal strength of the second receive chain Another aspect of the disclosure is directed to configuring the transmit power controller to adjust a power amplifier of the first transmit chain. Preferably, the transmit power controller is also configured to adjust analog and digital gains of the first transmit chain.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

Figure 1:
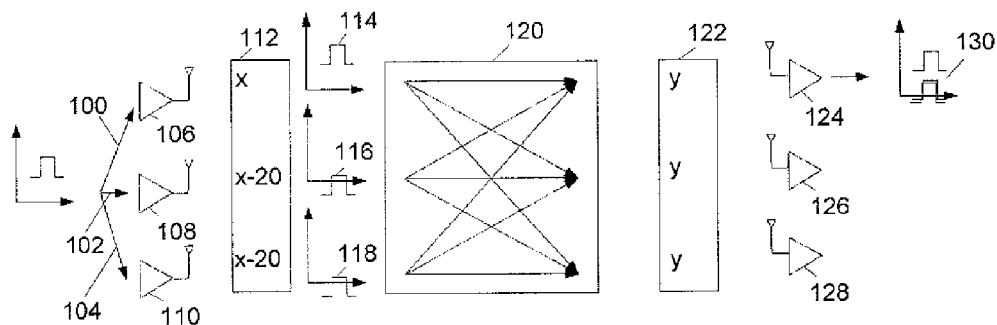
FIG. 1 is a schematic diagram of a MIMO wireless communication system, experiencing imbalanced antenna gain during transmission.
Figure 2:
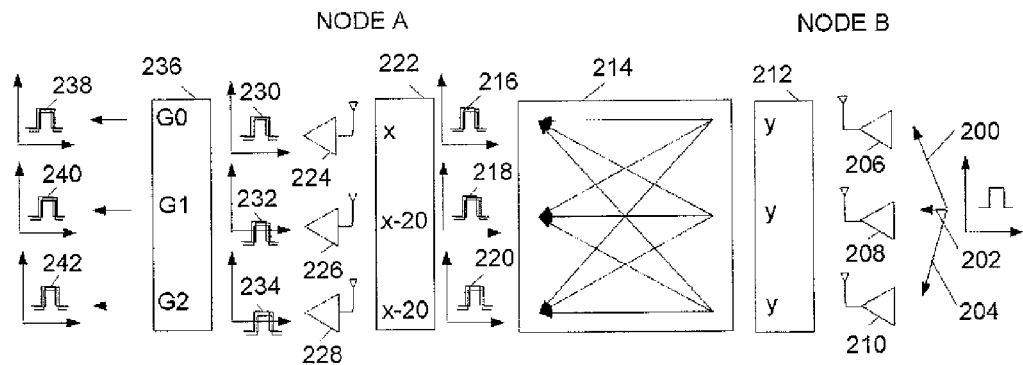
FIG. 2 is a schematic diagram of a MIMO wireless communication system, experiencing imbalanced antenna gain during reception.

This disclosure involves methods and systems for compensating for imbalanced transmit antenna gains. A transmit controller independently samples the received signal in each chain of a transceiver and selectively adjusts the transmit power at each antenna to minimize any indicated imbalance, improving performance at the node receiving the transmission.

At the outset, it is to be understood that this disclosure is not limited to particularly exemplified materials, methods or structures as such may, of course, vary. Thus, although a number of materials and methods similar or equivalent to those described herein can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities Unless specifically stated otherwise as apparent from the following discussions, it is appreciated that throughout the present application, discussions utilizing the terms such as "accessing," "receiving," "sending," "using," "selecting," "determining," "normalizing," "multiplying," "aver aging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices Generally, program modules include routines, programs, objects, components, data structures, etc, that perform particular tasks or implement particular abstract data types. The functionality of the program modules may be combined or distributed as desired in various embodiments By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal In the figures, a single block may be described as performing a function or functions; however, in actual practice, the function or functions performed by that block may be performed in a single component or across multiple components, and/or may be performed using hardware, using software, or using a combination of hardware and software Also, the exemplary transmission and receiving stations may include components other than those shown, including well-known components such as a processor and memory and perhaps audio and visual components.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

Figure 3:
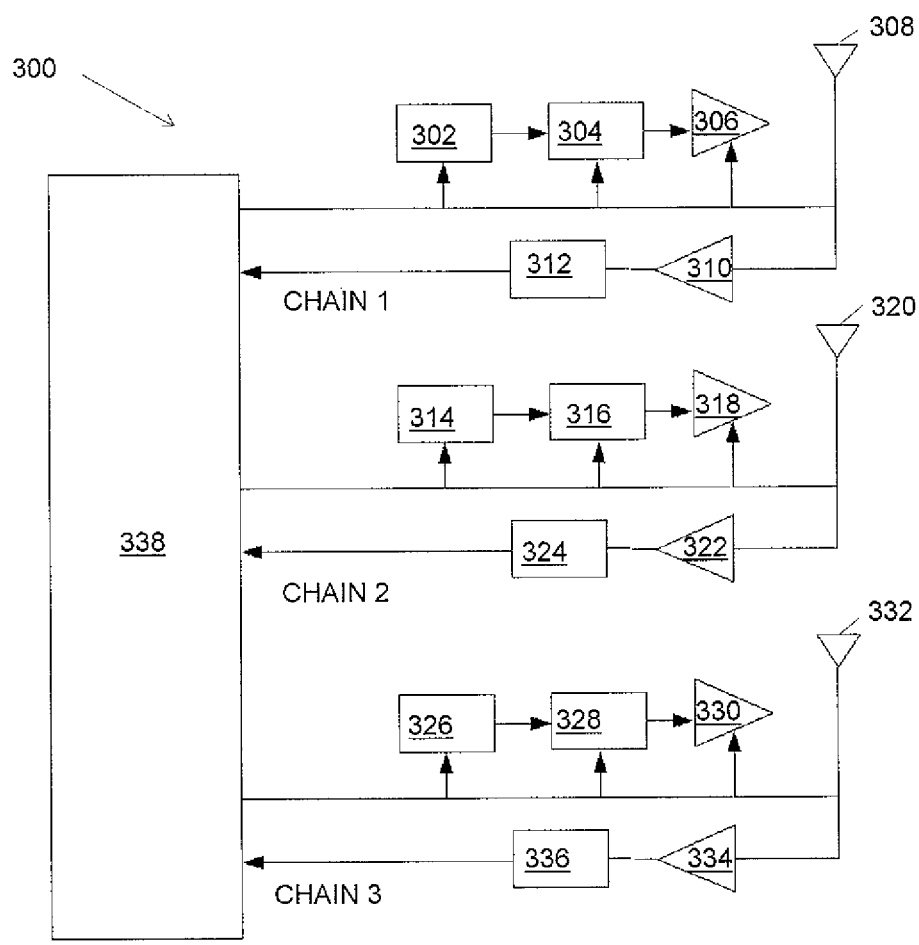
FIG. 3 is a schematic diagram showing the functional components of a MIMO wireless communication transceiver, according to the invention.

One of skill in the art will appreciate that a variety of wireless communication systems are suitable for implementing the techniques described below. FIG. 3 represents a functional block diagram of one embodiment of a transceiver 300 in a MIMO wireless communication system configured to adjust transmit power to compensate for imbalanced transmit antenna gains. Transceiver 300 generally includes a plurality of transmit and receive chains corresponding to the number of antennas present on the device. In this embodiment, three transmit and receive chains are indicated for use in a conventional 3×3 MIMO system.

Transmit chain 1 includes a baseband 302 coupled to an analog amplifier 304. Output from the analog amplifier 304 is fed to power amplifier 306 which then delivers the signal for transmission to antenna 308. Receive chain 1 correspondingly delivers a received signal from antenna 308 to low noise amplifier (LNA) 310. The strength of the signal obtained from LNA 310 is sampled by signal power sensor 312, preferably using a received signal strength indicator (RSSI).

Likewise, transmit chains 2 and 3 include baseband 314 and 326, analog amplifiers 316 and 328, and power amplifiers 318 and 330 coupled with antennas 320 and 332, respectively. Correspondingly, receive chains 2 and 3 have LNAs 322 and 334 and signal power sensors 324 and 336 associated with antennas 320 and 332, respectively.

As will be described in greater detail below, transmit controller 338 adjusts the transmit power at antennas 308, 320 and 332 by configuring the characteristics of power amplifiers 306, 318 and 330. Preferably, transmit controller 338 also configures the basebands and analog amplifiers to adjust analog and digital gain in the signal fed to the power amplifiers F or example, gain can be adjusted by digital scaling in the digital signal processing blocks of the baseband as well as at any point in the analog circuitry, including the mixers and the intermediate frequency circuits, as well as the analog amplifiers. Transmit controller 338 receives input from signal power sensors 312, 324 and 336 to measure the received signal power in each of the receive chains. Since an imbalance in received signal strength over a balanced channel infers a corresponding imbalance in transmit gain, transmit controller 338 uses measured received signal strength to adjust the transmit powers of antennas 308, 320 and 332 to compensate for this imbalance.

Transmit controller 338 can be configured to adjust the transmit power of an antenna by either attenuating or boosting the signal Generally, it is more practical to attenuate a strong signal than to boost a weak signal, since transmit powers are usually already set near the limits imposed by regulation or the physical capabilities of the equipment to maximize performance. In one embodiment, transmit controller 338 adjusts the transmit power of an antenna by an amount ranging from approximately the difference in measured signal strength between two receive chains and one half the difference. Preferably, transmit controller 338 adjusts the transmit power only when the adjustment would equal or exceed approximately 10 dB Alternatively, transmit controller 338 adjusts the transmit power of an antenna in a step-wise fashion. For example, when the difference between the signal strength in two receive chains exceeds a threshold value, the transmit power of one antenna is adjusted a fixed amount. Then, data throughput at that transmit power is assessed. In the next iteration, the transmit power is adjusted again by the fixed amount. The process continues as long as a performance gain is realized When there is a negative impact on performance, transmit controller preferably returns the adjustment of the transmit power to the previous level.

As discussed above, a significant spread in signal power can be experienced at a far side receiver in LOS conditions when there is an imbalance in the transmit antenna gains. Accordingly, it is preferable to employ the techniques of this disclosure when a LOS condition exists with a relatively balanced channel. A suitable indication of these factors is the reception of a signal in excess of a threshold value, since a relatively large signal strength measurement typically indicates the low path loss conditions of a short-range, LOS balanced channel. Generally, it is preferable to ensure that the transmit power correspond to at least approximately 30 dB RSSI at the receiver to enable enhanced data rates. Thus, in one embodiment, transmit controller 338 is configured to adjust transmit power when the signal power as measured by RSSI in one of the receive chains is greater than approximately 40 dB to include a margin for error. In another embodiment, transmit controller 338 is configured to adjust transmit power when the RSSI imbalance is greater than approximately 50 dB.

The techniques of this disclosure were tested to confirm the improvement. To mimic over the air conditions, an imbalanced antenna gain was introduced by manually attenuating certain signals in a cabled connection that was set up to estimate a balanced channel Performance under these conditions was measured and a degradation in data throughput was confirmed. Then, the transmit power of the stronger path was also lowered. By compensating for the imposed transmit gain imbalance, the performance loss was mitigated.

Described herein are presently preferred embodiments, however, one skilled in the art that pertains to the present invention will understand that the principles of this disclosure can be extended easily with appropriate modifications to other applications Although the disclosed embodiments are tailored to wireless communication employing a 3×3 MIMO antenna system operating under IEEE 802.11n, one of skill in the art would recognize that the techniques could be extended and adapted as necessary to accommodate other systems and standards. For example, the disclosed principles can be applied to any system having a transceiver with at least two antennas.

What is claimed is:

1. A method for compensating imbalanced transmit antenna gain in a wireless communication system having a transmission node with at least first and second antennas, first and second transmit chains associated with the first and second antennas and first and second receive chains associated with the first and second antennas, comprising:
    sampling signal strength in the first and second receive chains by determining a receive signal strength indicator (RSSI) representing a sum of all signal energy across a wideband channel;
    determining an imbalance in antenna gain on the basis of the sampled signal strength, and
    adjusting the transmit power of the first antenna to offset the imbalance.

2. The method of claim 1, wherein adjusting the transmit power of the first antenna occurs only when a signal strength of greater than approximately 40 dB is measured in one of the receive chains.

3. The method of claim 1, wherein adjusting the transmit power of the first antenna occurs only when a difference between the signal strength of the first receive chain and the signal strength of the second receive chain exceeds a threshold value.

4. The method of claim 1, wherein adjusting the transmit power comprises adjusting the transmit power of the first antenna by an amount approximately one half the difference between the signal strength of the first receive chain and the signal strength of the second receive chain.

5. The method of claim 1, wherein adjusting the transmit power comprises adjusting the transmit power of the first antenna by an amount approximately equal to the difference between the signal strength of the first receive chain and the signal strength of the second receive chain.

6. The method of claim 1, wherein adjusting the transmit power comprises adjusting a power amplifier of the first transmit chain.

7. The method of claim 6, wherein adjusting the transmit power further comprises adjusting analog and digital gains of the first transmit chain.

8. The method of claim 1, wherein adjusting the transmit power comprises adjusting the transmit power of the first antenna by a fixed amount.

9. The method of claim 8, further comprising readjusting the transmit power of the first antenna by the fixed amount if adjusting the transmit power of the first antenna by a fixed amount resulted in an improvement in data throughput.

10. A system for wireless communication comprising a transmission node having at least first and second antennas, first and second transmit chains associated with the first and second antennas, first and second receive chains associated with the first and second antennas, and a transmission power controller configured to adjust transmit power at the first and second antennas, wherein the transmission power controller adjusts the transmit power of the first antenna when signal strength as measured by a receive signal strength indicator (RSSI) in the first receive chain differs from signal strength as measured by a RSSI in the second receive chain, wherein each RSSI represents a sum of all signal energy across a wideband channel.

11. The system of claim 10, wherein the first and second receive chains comprise a signal power sensor functionally coupled to the transmission power controller.

12. The system of claim 11, wherein the first and second receive chains comprise a low noise amplifier and wherein the signal power sensor is positioned downstream from the low noise amplifier.

13. The system of claim 11, wherein the transmit power controller adjusts the transmit power of the first antenna when the signal power sensor measures a signal strength in one of the receive chains greater than approximately 40 dB.

14. The system of claim 13, wherein the transmit power controller adjusts the transmit power of the first antenna when the signal strength in the first receive chain differs from the signal strength in the second receive chain by a threshold value.

15. The system of claim 14, wherein the transmit power controller adjusts the transmit power of the first antenna by an amount approximately one half the difference between the signal strength of the first receive chain and the signal strength of the second receive chain.

16. The system of claim 14, wherein the transmit power controller adjusts the transmit power of the first antenna by an amount approximately equal to the difference between the signal strength of the first receive chain and the signal strength of the second receive chain.

17. The system of claim 10, wherein the transmit power controller is configured to adjust a power amplifier of the first transmit chain.

18. The system of claim 17, wherein the transmit power controller is configured to adjust analog and digital gains of the first transmit chain.

* * * * *